(12) United States Patent
Flannaghan et al.

(10) Patent No.: US 6,259,489 B1
(45) Date of Patent: Jul. 10, 2001

(54) VIDEO NOISE REDUCER

(75) Inventors: Barry Flannaghan, Winchester; Martin Weston, Hampshire, both of (GB)

(73) Assignee: Snell & Wilcox Limited, Middlesex (GB)

( * ) Notice: Subject to any disclaimer, the term of this patent is extended or adjusted under 35 U.S.C. 154(b) by 0 days.

(21) Appl. No.: 09/171,128

(22) PCT Filed: Apr. 14, 1997

(86) PCT No.: PCT/GB97/01049

§ 371 Date: Apr. 21, 1999

§ 102(e) Date: Apr. 21, 1999

(87) PCT Pub. No.: WO97/39572

PCT Pub. Date: Oct. 23, 1997

(30) Foreign Application Priority Data

Apr. 12, 1996 (GB) ................................. 96076682

(51) Int. Cl.⁷ .................................................. H04N 5/21
(52) U.S. Cl. ........................... 348/620; 348/618; 348/701
(58) Field of Search .................... 348/701, 607, 348/618–620, 622; 382/265

(56) References Cited

U.S. PATENT DOCUMENTS

| 4,064,530 | * | 12/1977 | Kaiser et al. | 358/36 |
| 4,249,210 | * | 2/1981 | Storey et al. | 358/167 |
| 4,639,784 | * | 1/1987 | Fling | 358/167 |
| 4,737,850 | * | 4/1988 | Lu et al. | 358/167 |
| 5,025,316 | * | 6/1991 | Darby | 358/167 |
| 5,185,664 | * | 2/1993 | Darby | 358/167 |
| 5,404,178 | | 4/1995 | Kondo et al. | |
| 5,612,752 | * | 3/1997 | Wischermann | 348/701 |

FOREIGN PATENT DOCUMENTS

| 0578311A2 | 1/1994 | (EP) . |
| 0640908A1 | 3/1995 | (EP) . |
| 2575886 | 7/1986 | (FR) . |
| 2251353A | 7/1992 | (GB) . |
| 02248173 | 10/1990 | (JP) . |

* cited by examiner

Primary Examiner—Victor R. Kostak
(74) Attorney, Agent, or Firm—Venable; Robert Kinberg

(57) ABSTRACT

In a video noise reducer, where pixel information is recursively filtered, with recursion being disabled at a disjuncture (caused by motion, planning, shot-change or otherwise), recursively filtered pixel information prior to disjuncture continues to be output until pixel information following the disjuncture has been recursively filtered to an appropriate degree of noise reduction.

8 Claims, 4 Drawing Sheets

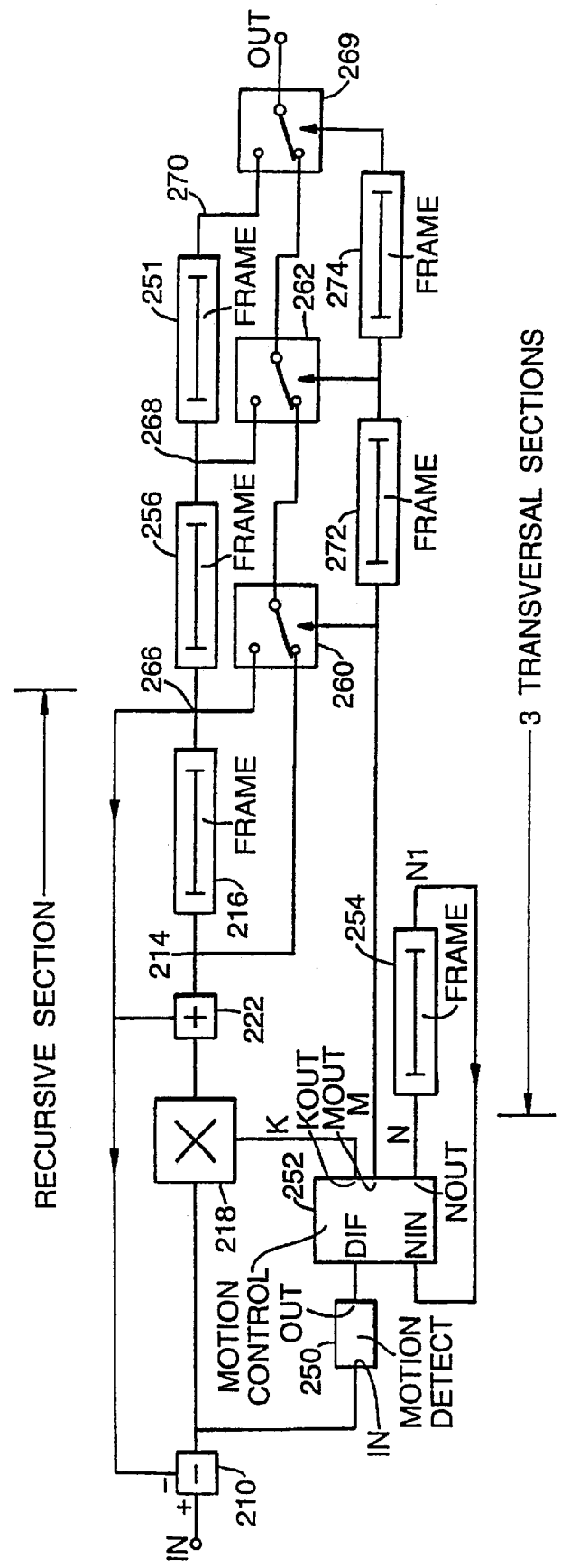

VIDEO NOISE REDUCER

BACKGROUND OF THE INVENTION

This invention relates to video noise reducers and method's of noise reduction.

A well known method for the reduction of noise In a video signal employs a recursive Filter, The method operates by averaging similar areas in successive images and relies on the fact that the true image information in a video signal is highly correlated, Noise, however, is generally random and is attenuated in the averaging process, A recursion constant k determines the relative weightings of the current and preceding frames in the averaging process and thus the number of frames over which effective averaging takes place. Significant attenuation of noise can be achieved with averaging over a relatively small number of frames.

It is well understood that the picture correlation upon which recursive noise reduction relies, breaks down where there is movement in the input images. It is important to disable the recursion when movement is detected; failure to do this will result in image smear. Motion adaptive noise reduction has the annoying artifact, that picture regions at the edges of moving objects are substantially noisier than the surrounding picture. An edge of a moving object is associated with disabling of recursive noise reduction so that each edge of the moving object will be followed by a region of signal which is not noise reduced. The problem is exacerbated by the need—usually—for the motion detector signal to be filtered spatially; this results in an even larger area which lacks noise reduction. It is also the case that the more effective is the noise reduction process over the image as a whole, the more noticeable are the noisy regions around moving objects.

Whilst the need to avoid smearing has been described in relation to the detection of moving objects, the disabling of recursion will apply also to global motion such as panning and also to shot changes and other edits.

SUMMARY OF THE INVENTION

It is an object of this invention to provide an improved video noise reducer and method of noise reduction which removes or reduces the above problem.

Accordingly, the present invention consists in a method of noise reduction in a video signal, wherein pixel information is recursively filtered, with recursion being disabled at a disjuncture, wherein recursively filtered pixel Information prior to a disjuncture continues to be output until pixel information following the disjuncture has been recursively filtered to an approximate degree of noise reduction.

Advantageously, the output of a recursive filter is presented to a picture interval delay chain and following detection of a disjuncture and disabling of recursion, a selection is made between picture interval delayed filter outputs.

The present invention recognises that, taking the example of a shot change, the visually disturbing effect of replacing a quiet, heavily noise-reduced shot by the first noisy field of a now shot can be avoided by delaying showing the new shot until sufficient fields have been recursively filtered for the noise level on the new shot to have approached or equaled that of the current shot. The same approach applies of course pixel-by-pixel in the face of motion.

In this aspect, the present invention further consists in a video noise reduction filter comprising a temporal recursive filter; means for disabling recursion in the filter on detection of motion; a delay path affording multiple filter outputs mutually delayed by picture intervals; and means for selecting between said filter outputs on detection of motion to provide an output having maximum noise.

It is an object of a preferred form of the present invention to provide an improved video noise reduction filter and method of noise reduction utilising a temporal recursive filter, in which after a disjuncture—such as motion—leading to disabling of recursion, noise levels are more rapidly reduced.

Accordingly, it is advantageously provided that the recursion is controlled after a disjuncture such that available pixels contribute equally to the filter output.

It has been found, for examples that where pixels a and b are available, noise is minimized by taking the output $(a+b)/2$. Similarly, if pixels a, b and c are available, the preferred output is $(a+b+c)/3$.

Preferably, the recursion constant is varied in dependence upon the count of picture intervals since a disjuncture reading to disabling of recursion.

BRIEF DESCRIPTION OF THE DRAWINGS

The present invention will now be described by way of examples with reference to the accompanying drawings in which:

FIG. 8 is a diagram of a noise reducer according to a further embodiment of this invention.

DETAILED DESCRIPTION OF THE INVENTION

Figure 1:
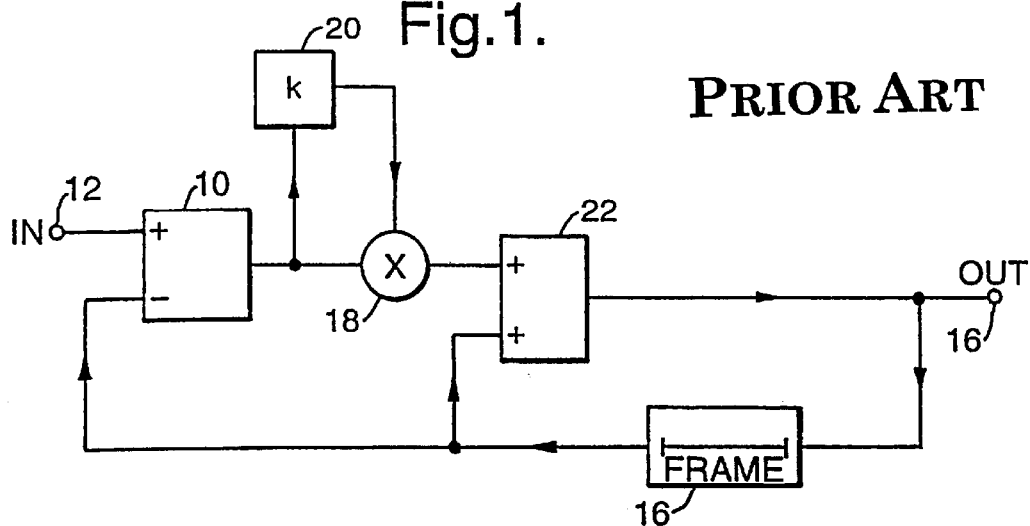
FIG. 1 is a block diagram of a well known temporal recursive noise reduction filter.

It is convenient to describe first a temporal noise reduction filter according to the prior art. Referring to FIG. 1, a subtractor 10 serves to derive the difference between the input video signal at terminal 12 and the signal at the output 14 of the filter, delayed by one frame in delay 16. The frame difference signal which is output by the subtractor 10 passes through a multiplier 18, the coefficient k of which is generated in noise measurement system and control block 20 which receives the frame difference signal as an input. In this arrangement, the rectified and filtered difference between the incoming signal and the frame delayed output of the filter is taken as a measure of motion. The signal passing through multiplier 18 is added in adder 22 to the output of frame delay 16 to derive the filter output on terminal 14.

It will be recognised that the circuit of FIG. 1 serves, for each pixel, to add to the filter output in the previous frame, k times the difference between the current pixel and the filter output in the previous frame. In the absence of motion, that is to say with a small frame difference signal outputted from subtractor 10, a value is chosen for k of perhaps 0.5. The filter output in that example will comprise 50% of the current frame, 25% of the preceding frame, 12.5% of the next preceding frame and so on. If motion is detected, that is to say the frame difference signal output from subtractor 10 exceeds a predetermined threshold, the value of k is set to unity. The combined effect of subtractor 10 and adder 22 is then first to subtract and then to add the filter output from the preceding frame leaving only information from the current frame. Setting the value of k to unity accordingly disables the recursion.

Figure 2:
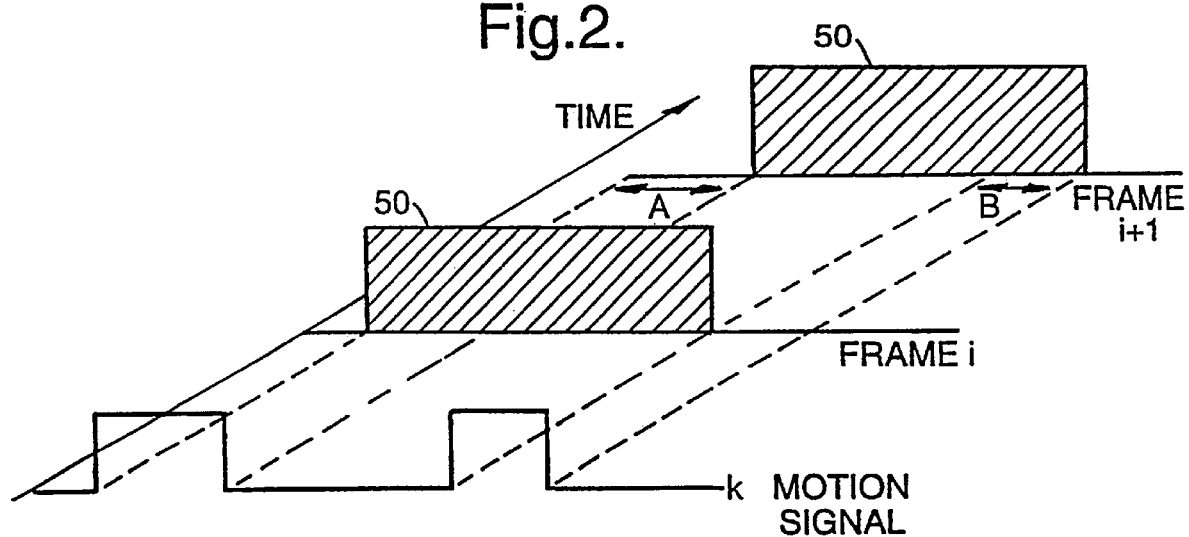
FIG. 2 is a diagram illustrating the problem which is addressed by the present invention.

Turning now to FIG. 2, an object 50 is depicted as moving in position between frame i and frame i+1. A motion signal k is illustrated, being the rectified difference between frame i and frame i+1. It will be seen that the value of k goes high at the leading edge of the object in frame i and falls at the leading edge of the object in frame i+1. Similarly, the value of k goes high at the trailing edge of the object in frame i and falls at the trailing edge of the object in frame i+1. It will be understood that during the intervals over which the value of k is high, the recursive noise reduction is disabled. There are thus created regions in the picture at the edges of the moving object at which there is no noise reduction. These regions are shown for frame i+1 at A and B.

Whist the motion signal k has been depicted as simply the rectified frame difference, it has been customary to filter the motion signal, causing spatial spreading.

The relatively more noisy regions A and B in the noise reduced output of the prior art filter represent an artifact, the visual effect of which becomes more disturbing as the noise reduction and other qualities of the output image improve.

Figure 3:
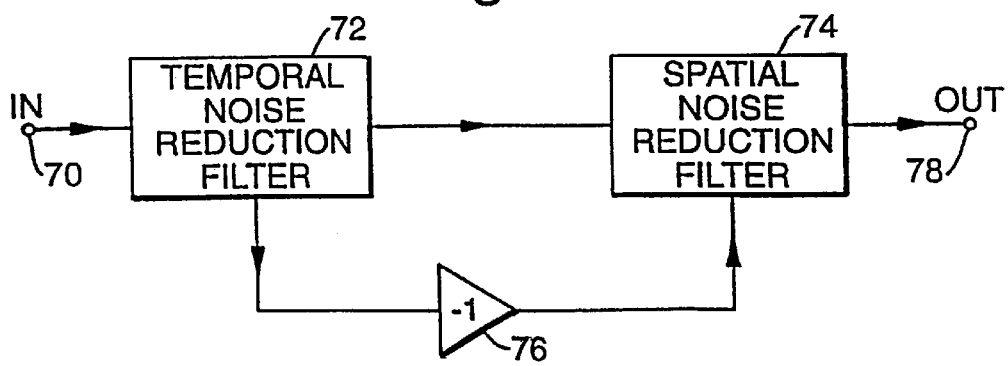
FIG. 3 is a block diagram of one embodiment of the present invention.

The present invention solves this problem, in one embodiment, with an arrangement as depicted schematically in FIG. 3. The video signal input on terminal 70 passes through a motion adaptive temporal noise reduction filter 72 which may be of the form shown in FIG. 1, but may take a variety of other forms. Other forms of recursive filters could be employed as well as different temporal noise reduction filters such as FIR'S. The output of the filter 72 passes to a spatial noise reduction filter 74. This filter 74 receives as a control input the motion signal derived internally in the filter 72, inverted at 76. The output of the spatial noise reduction filter passes to the output terminal 78.

In the simple example in which the filter 72 is a recursive filter having a normally fixed recursion coefficient k which is switched immediately on detection of motion to a value which disables recursion, the normally low motion signal will after inversion hold the spatial noise reduction filter 74 disabled. The signal at output terminal 78 will accordingly be the temporally noise reduced output of filter 72. As the motion signal goes high, disabling the temporal filter 72, the inverted motion signal going low will enable—in a complementary manner—the spatial filter 74. The input signal then passing essentially transparently through the temporal filter 72 will undergo spatial noise reduction in the filter 74.

In a more typical situation, the motion signal will not be a square wave and the temporal and spatial filters will fade in and fade out in a complementary manner.

The spatial noise reduction filter can take a variety of forms and may comprise a low pass filter operating both horizontally and vertically. To avoid the softening of edges, the spatial filter is preferably adaptive, allowing edges above a defined magnitude to pass unfiltered. Advantageously, the level above which edges are passed unfiltered is set by a global measurement of noise. Thus at low noise levels, even relatively low magnitude edges can safely be passed.

Usefully, a control output from the temporal noise reduction filter can be used as an appropriate global noise measurement for the adaption in the spatial noise reduction filter.

Figure 4:
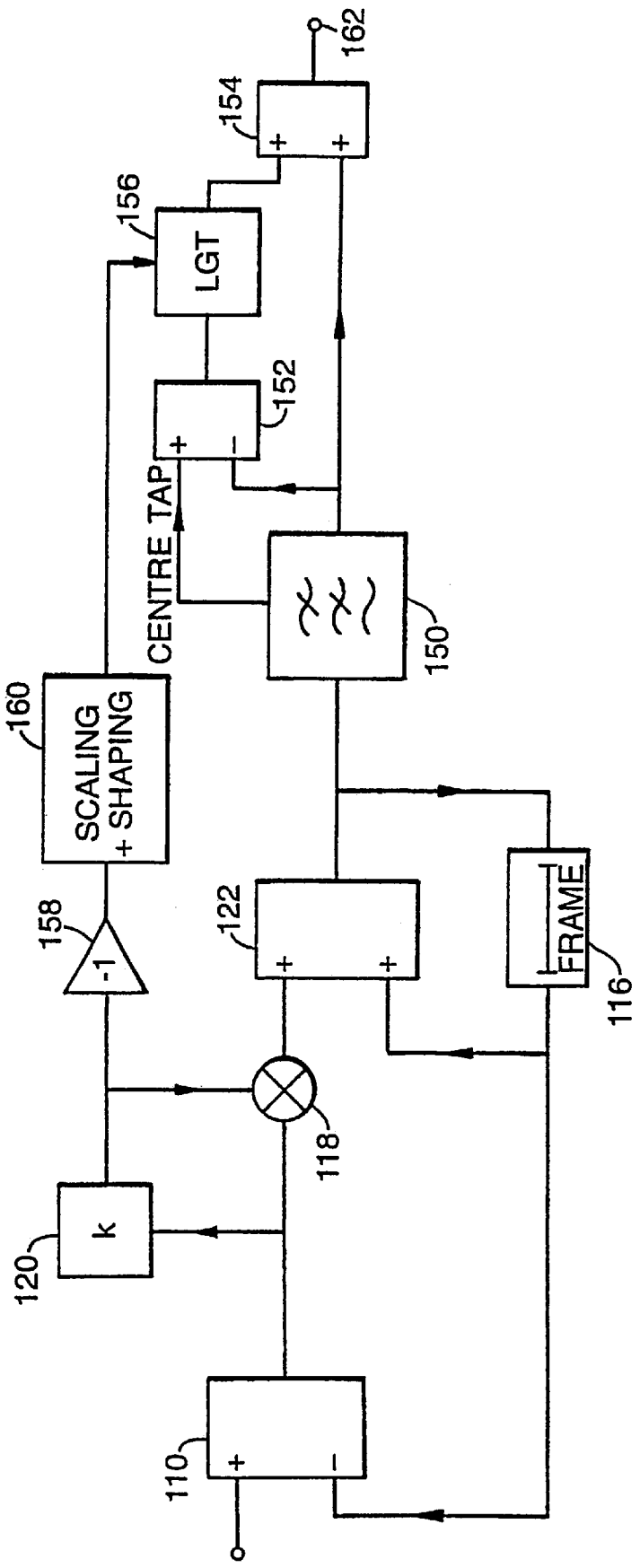
FIG. 4 is a more detailed diagram illustrating an embodiment of the present invention.

There will now be described with reference to FIG. 4 a specific embodiment according to the present invention.

This arrangement incorporates a temporal recursive noise reduction filter as shown in FIG. 1. Accordingly, the arrangement and function of subtractor 110, frame delay 116, multiplier 118, noise measurement system and control block 120 and adder 122 need not be described further, save to remark that the block 120 preferably performs a global measurement of noise and uses this measure in non-linear processing to produce a parameter k which relates in principle to motion and not to noise. The output signal from this arrangement is taken to a low pass filter 150. The output of filter 150 is taken both to the inverting input of subtractor 152 and to adder 154. Separately, the centre tap of the low pass filter 150 is taken to the non-inverting input of subtractor 152. The output from this subtractor 152 is taken to adder 154, after non-linear processing by means of a look-up table 156. The secondary address portion for this look-up table is provided by the motion signal output from block 120 after passing through inverter 158 and scaling and shaping block 160. The function of the block 160 is to ensure that the visual effect of a control parameter n upon the spatial filter is complementary to the effect of the parameter k upon the temporal filter.

Figure 5:
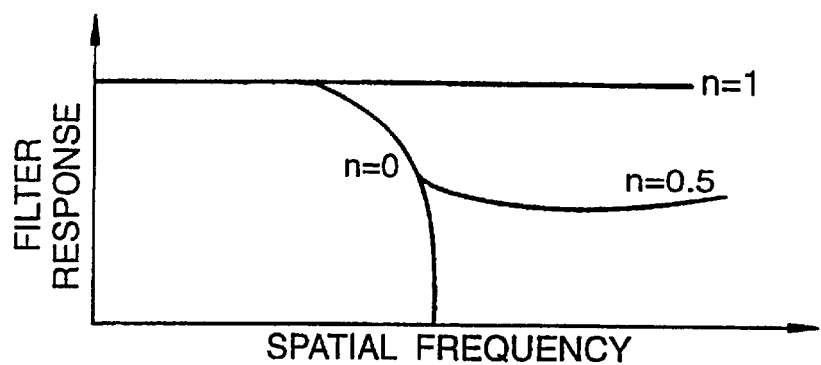
FIG. 5 is a graph illustrating the required response of a spatial noise reduction filter in one embodiment of the present invention.

The required behaviour of the spatial noise reduction filter which is formed by the circuit elements 150 to 156 is shown graphically in FIG. 5.

The parameter n, although scaled and shaped, is in general terms the inverse of the signal which disables the temporal noise reduction filter in the face of motion. Thus when k=1, n=0. In the absence of motion, with full recursion in the temporal noise reduction filter, n=1. Thus turning to FIG. 5, it will be seen that at n=1, the filter response of the spatial noise reduction filter is flat. At the value n=0, corresponding to disabling of temporal recursion, the spatial filter response is that of a low pass filter. At a value n=0.5, the filter response is intermediate between the n=0 and the n=1 cases. In practice, n will undergo shaping in block 160.

Figure 6:
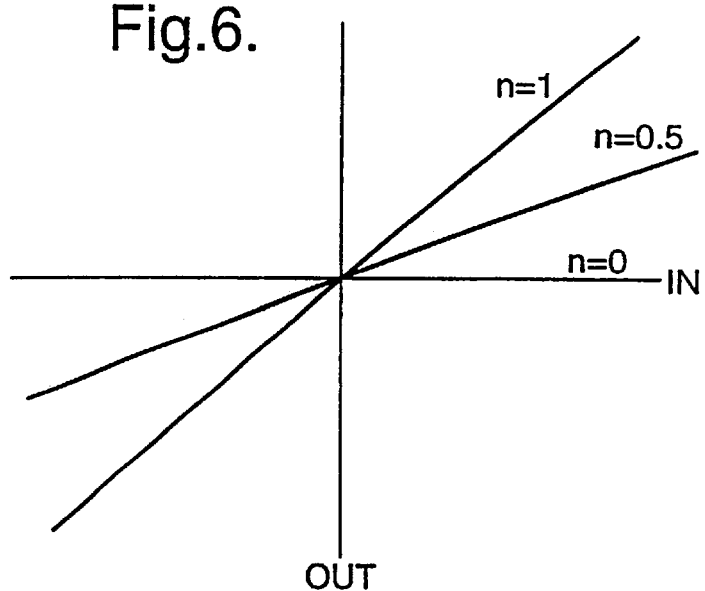
FIG. 6 is a graph illustrating the contents of a look-up table employed in the arrangement of FIG. 4.

The required behaviour is achieved, in this example, by a look-up table having the behaviour shown in FIG. 6. For the case n=1, the value output by the look-up table 156 corresponds to the output of the subtractor 152. Accordingly, the centre tap of the filter 150 is passed directly to the output terminal 162; the output of the filter 150 being cancelled in subtractor 152 and adder 154. At the other extreme case of n=0, the output of the look-up table is zero for all subtractor outputs. The adder 154 then delivers to the output 162, only the output of low pass filter 150.

If the spatial noise reduction filter takes a form other than an FIR so that a centre tap is not available, the input to the filter—with a compensating delay—will serve the same function as the centre tap.

Figure 7:
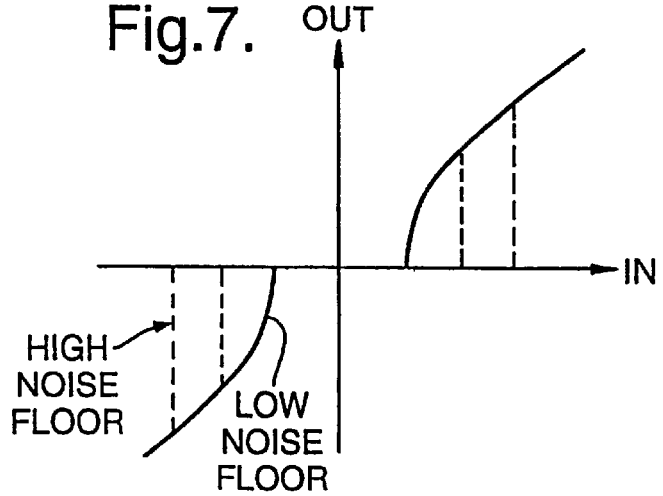
FIG. 7 is a graph illustrating the contents of a supplementary look-up table.

In a preferred arrangement, the look-up table receives a further address portion from the block 120 which is a global measure of noise. The look-up table, in dependence upon this noise level control input, performs the function shown in FIG. 7. It will be seen that for values of input above a variable noise floor, the output of the look-up table equals the input and spatial filtering is disabled, irrespective of motion.

It will be seen that, in this manner, an output is provided which in the absence of motion is a temporally recursive filter signal with no spatial noise reduction. In the face of motion, there is no recursive filtering; spatial filtering is introduced if the spatial differential (being the difference between the output tap and centre tap of the filter 150) is below a threshold. This threshold varies such that in low noise conditions, edges which are small in magnitude but nevertheless greater than surrounding noise, can safely be passed.

The above described arrangements are examples of the provision of spatial reduction which is enabled on detection of motion leading to the disabling of temporal noise reduction. A wide variety of further examples will present themselves to the skilled reader.

It is instructive to consider the noise level in a recursive noise reduction filter and how this affects the choice of an optimum value of k. It has been explained that where motion is detected, k should be unity to allow the motion through without recursion. In stationary areas, k controls the ratio of input signal to stored signal. The optimum value depends upon the level of noise currently on the stored signal. This depends, in turn, upon the length of time since motion was last detected and thus the degree to which recursion has reduced noise.

If the noise power on the input is $\sigma_i^2$ and on the stored signal is or $\sigma_s^2$ then the noise on the output will be:

$$\sigma_o^2 = \sigma_i^2 * k^2 + \sigma_s^2 * (1-k)^2$$

This is a minimum if:

$$k_{opt} = \frac{1}{\left(1 + \frac{\sigma_i^2}{\sigma_s^2}\right)}$$

In which case:

$$\sigma_o^2 = \frac{\sigma_i^2}{\left(1 + \frac{\sigma_i^2}{\sigma_s^2}\right)}$$

Just after motion stops at the current point, $\sigma_s^2 = \sigma_i^2$, so $k_{opt} = \frac{1}{2}$ and $\sigma_o^2 = \sigma_i^2/2$. This becomes the new stored signal. So on the next frame $\sigma_s^2 = \sigma_i^2/2$, $k_{opt} = \frac{1}{3}$ and $\sigma_o^2 = \sigma_i^2/3$. So on successive frames the noise power is reduced by ½, ⅓, ¼, ⅕, ... etc. provided that the value of k is ½, ⅓, ¼, ⅕, ... etc.

In preferred forms of this invention, the derivation of k embodies this approach. Indeed, the present invention contemplates a more general use of this approach to enable noise reduction filters to reduce noise levels more quickly after a disjuncture, irrespective of whether separate measures are taken to reduce the visibility of disabling of recursion.

If the value of a particular pixel in successive pictures after a disjuncture is denoted a:b:c:d:e:

successive outputs of a recursive filter might be:

$$a : \frac{(a+b)}{2} : \frac{(a+b+c)}{3} : \frac{(a+b+c+d)}{4}$$

If a disjuncture occurs between pixel values d and e, caused by motion, for example, or a shot change, recursion will be disabled and the filter output will take the form:

$$a : \frac{(a+b)}{2} : \frac{(a+b+c)}{3} : \frac{(a+b+c+d)}{4} :$$

$$e : \frac{(e+f)}{2} : \frac{(e+f+g)}{3}$$

In both cases, the rate at which the noise level is reduced from the relatively high levels at a and b, should be significantly faster as a result of this dependence of the value of k upon the count of frames since the disjuncture. It will be observed that in the period following a disjuncture, available pixels contribute equally to the filter output.

It will be understood that, nonetheless, the noise level will increase significantly after:

$$\frac{(a+b+c+d)}{4}$$

In the previous embodiments of this invention, the lack of temporal noise reduction in e was compensated for by spatial noise reduction. In a further embodiment of this invention, the visual effect of increased noise in e is avoided by introducing a picture interval delay or delays and continuing to output:

$$\frac{(a+b+c+d)}{4}$$

until the recursive filter has produced an output following the disjuncture, which is appropriately noise reduced, for example:

$$\frac{(e+f+g+h)}{4}$$

An example of a noise reducer according to this embodiment of the invention will now be described with reference to FIG. 8. It will be seen that the left-hand portion of the circuit, marked "recursive section", corresponds generally to the previously described temporal noise reduction filter. It will accordingly not be necessary to describe again the function of subtractor 210, multiplier 218, adder 222 and frame delay 216. In this embodiment, derivation of the signal k is performed in two stages. A motion detector block 250 receives the output from subtractor 210 and carries out appropriate filtering. A motion detection signal is then passed to one input of a motion control block 252, one function of this block being to provide a k signal having the properties discussed above, by which the correct proportions are maintained in the recursion to optmise noise reduction. To ensure that k follows this optimum sequence, the current value of:

$$n_0 = \frac{\sigma_i^2}{\sigma_o^2}$$

is stored for each pixel in the frame using a loop containing frame delay 254. The motion control block 252 additionally derives a signal m. The function of which will be described later.

The circuit of FIG. 8 comprises, to the right-hand end, a transversal filter containing three frame delays. The frame delay 216 of the recursive section doubles as the first frame delay in a transversal section and there are additional frame delays 256 and 258. Switches 260, 262 and 264 are provided to select appropriate outputs from the frame delay path. Switch 260 selects between the output 214 of the recursive noise reduction filter and the point 266 of the output from the frame delay 216. The switch 262 selects between the output of the switch 260 and the point 268 intermediate between frame delays 266 and 258. Switch 264 switches between the output of switch 262 and the point 270 at the output of frame delay 258.

The control input of switch 260 is the signal m from the motion control block 252. This signal passes through frame delays 272 and 274 to provide the control inputs for switches 262 and 264 respectively.

The frame delays 216, 256 and 258 may be regarded as a picture-interval delay path affording, through the switches 260, 262 and 264 picture delayed outputs from the recursive filter. By suitable control of the signal m, it is arranged that each of the switches selects the quietest of its two inputs.

The switch 260 can choose between the output of the recursive section and its stored output. From the previous analysis, the noise power on the output is:

$$\sigma_o^2 = \sigma_j^2 * k^2 + \sigma_s^2 * (1-k)^2$$

So m should select the stored output if:

same decision (m). On the other hand, if the first is currently selecting the non-delayed output (because it is quieter than the delayed output) then the second switch should ideally remake the decision using a lower threshold. However, since the threshold is not really critical, satisfactory results are obtained by simply using the original decision (m) delayed by one frame in both cases. Similarly, subsequent switches can also be controlled by delayed versions of m. The slight error introduced by this simplification can be reduced on average by using a slightly lower threshold to generate m.

The motion control block can be implemented in many ways. The simplest is probably a PROM containing pre-computed output values for all combinations of its inputs.

To clarify the operation of the circuit, the previous notation will be employed of successive pixel values a, b, c, d . . . separated by a picture interval, with a disjuncture such as a shot change occurring between d and e. The signal appearing at critical locations are shown in the following table:

|   | 214 | 266 | 268 | 270 | m | 260 | 262 | out |
|---|---|---|---|---|---|---|---|---|
| a | a | z | y | x | 1 | z | ? | ? |
| b | $\frac{a+b}{2}$ | a | z | y | 0 | $\frac{a+b}{2}$ | z | ? |
| c | $\frac{a+b+c}{3}$ | $\frac{a+b}{2}$ | a | z | 0 | $\frac{a+b+c}{3}$ | $\frac{a+b+c}{3}$ | z |
| d | $\frac{a+b+c+d}{4}$ | $\frac{a+b+c}{3}$ | $\frac{a+b}{2}$ | a | 0 | $\frac{a+b+c+d}{4}$ | $\frac{a+b+c+d}{4}$ | $\frac{a+b+c+d}{4}$ |
| e | e | $\frac{a+b+c+d}{4}$ | $\frac{a+b+c}{3}$ | $\frac{a+b}{2}$ | 1 | $\frac{a+b+c+d}{4}$ | $\frac{a+b+c+d}{4}$ | $\frac{a+b+c+d}{4}$ |
| f | $\frac{e+f}{2}$ | a | $\frac{a+b+c+d}{4}$ | $\frac{a+b+c}{3}$ | 0 | $\frac{e+f}{2}$ | $\frac{a+b+c+d}{4}$ | $\frac{a+b+c+d}{4}$ |
| g | $\frac{e+f+g}{3}$ | $\frac{e+f}{2}$ | e | $\frac{a+b+c+d}{4}$ | 0 | $\frac{e+f+g}{3}$ | $\frac{e+f+g}{3}$ | $\frac{a+b+c+d}{4}$ |
| h | $\frac{e+f+g+h}{4}$ | $\frac{e+f+g}{3}$ | $\frac{e+f}{2}$ | e | 0 | $\frac{e+f+g+h}{4}$ | $\frac{e+f+g+h}{4}$ | $\frac{e+f+g+h}{4}$ |
| i | $\frac{e+f+g+h+i}{5}$ | $\frac{e+f+g+h}{4}$ | $\frac{e+f+g}{3}$ | $\frac{e+f}{2}$ | 0 | $\frac{e+f+g+h+i}{5}$ | $\frac{e+f+g+h+i}{5}$ | $\frac{e+f+g+h+i}{5}$ |

$$\sigma_s^2 < \sigma_j^2 * k^2 + \sigma_s^2 * (1-k)^2$$

This condition reduces to:

$$k > \frac{2}{1 + \frac{\sigma_j^2}{\sigma_s^2}}$$

In practice the value of k (generated by analysis of the motion) will pass very rapidly between $k_{opt}$ and unity. So the exact threshold is not critical.

The next switch can choose between the previous delayed output, and the output of the first switch. If the first switch is currently selecting the stored output, then the second switch is offered delayed versions of the signals offered to the first switch, and so it can use a delayed version of the It will be seen that when the value e appears at the input of the filter, the previously noise reduced value:

$$\frac{a+b+c+d}{4}$$

is continued to be output until a further three values f, g, h have been received at the input enabling recursive noise reduction following the disjuncture to create a value:

$$\frac{e+f+g+h}{4}$$

which has the same noise value.

It should be understood that the described arrangement of delays and switches is but one example of how choices can be made between delayed outputs of the recursive filter to select outputs having minimum noise. More generally, this invention has been described by way of examples only and a wide variety of possible modifications are possible without departing from the scope of the invention.

What is claimed is:

1. A method of noise reduction in a video signal, comprising the steps of:

recursively filtering pixel information;

disabling the recursive filtering at a disjuncture; and following the disjuncture, continuing to output pixel information recursively filtered prior to the disjuncture until pixel information following disjuncture has been recursively filtered to an appropriate degree of noise reduction.

2. A method according to claim 1, wherein the output of a recursive filter is presented to a picture interval delay chain and following detection of a disjuncture and disabling of recursion, a selection is made between picture interval delayed filter outputs.

3. A method according to claim 1, wherein on detection of a disjuncture in the form of a shot change, from a first shot to a second shot, outputting of fields from the second is delayed until sufficient fields have been recursively filtered for the noise level on the second shot to have been reduced to approximately total of the first.

4. A method according to claim 1, wherein on detection of a disjuncture in the form of motion, outputting of pixels arising after the disjuncture is delayed until sufficient pixels have been recursively filtered for the noise level after the disjuncture to have been reduced to approximately that before the disjuncture.

5. A method according to claim 1, wherein the recursion is controlled after a disjuncture such that available pixels contribute equally to the filter output.

6. A method according to claim 5, in which the recursion constant is varied in dependence upon the count of picture intervals since a disjuncture leading to disabling of recursion.

7. A method according to claim 1, wherein the recursion constant is varied after a disjuncture in dependence upon the count of picture intervals since the disjuncture, to minimize the output noise level.

8. A video noise reduction filter comprising a temporal recursive filter; means for disabling recursion in the filter on detection of motion; a delay path affording multiple filter outputs mutually delayed by picture intervals; and means for selecting between said filter outputs on detection of motion to provide an output having minimum noise.

* * * * *